United States Patent

Kimura et al.

Patent Number: 4,879,325
Date of Patent: Nov. 7, 1989

[54] PAINT COMPOSITION FOR CATION ELECTRODEPOSITION PAINTING

[75] Inventors: Hitoshi Kimura, Chigasaki; Shigenori Kazama, Yokosuka; Akitoshi Shirasaka, Uruyasu; Kiyoshi Taki, Narashino; Yukihiro Manabe, Amagasaki, all of Japan

[73] Assignees: Nissan Motor Co., Ltd., Yokohama; Shinto Paint Co., Ltd., Amagasaki, both of Japan

[21] Appl. No.: 79,970

[22] Filed: Jul. 31, 1987

[30] Foreign Application Priority Data

Aug. 5, 1986 [JP] Japan .................. 61-182825

[51] Int. Cl.$^4$ ........................................... C08F 283/10
[52] U.S. Cl. .................................. 523/404; 523/413; 523/415; 523/417; 523/428; 523/458; 523/459; 523/466; 523/468; 525/69; 525/111; 525/113; 525/526; 525/528
[58] Field of Search ............... 523/404, 413, 415, 417, 523/428, 458, 459, 466, 468; 525/69, 113, 521, 528

[56] References Cited

U.S. PATENT DOCUMENTS

| | | | |
|---|---|---|---|
| 3,341,617 | 9/1967 | Schleimer et al. | 526/337 |
| 3,428,699 | 2/1969 | Schleimer | 528/340 |
| 3,789,090 | 1/1974 | Otsuki et al. | 260/669 P |
| 3,922,253 | 11/1975 | Jerabek et al. | 523/415 |
| 4,072,536 | 2/1978 | Otsuki et al. | 525/382 |
| 4,251,414 | 2/1981 | Nakada et al. | 525/526 |
| 4,370,453 | 1/1983 | Omika et al. | 525/450 |
| 4,433,078 | 2/1984 | Kersten et al. | 523/404 |
| 4,514,548 | 4/1985 | Holubka | 525/526 |
| 4,579,886 | 4/1986 | Otsuki et al. | 523/404 |
| 4,642,325 | 2/1987 | Otsuki et al. | 525/65 |
| 4,732,950 | 3/1988 | Nagai et al. | 523/404 |

Primary Examiner—John C. Bleutge
Assistant Examiner—David W. Woodward
Attorney, Agent, or Firm—Foley & Lardner, Schwartz, Jeffery, Schwaab, Mack, Blumenthal & Evans

[57] ABSTRACT

A paint composition for cation electrodeposition painting, used for painting automotive vehicle body etc. The paint composition comprises basic unsaturated modified epoxy ester expressed by the general formula:

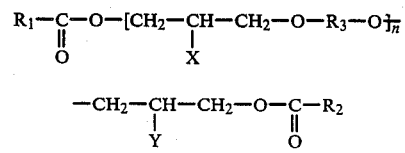

where $R_1$ and $R_2$ are functional groups at least one of which is $\alpha, \beta$-ethylenic double bond containing groups and the remainder is an unsaturated fatty acid chain; $R_3$ is a group expressed by the formula:

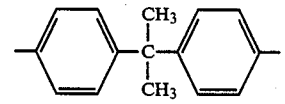

and X and Y are functional groups whose total number is $n+1$ in which not less than one functional group is a group containing both a tertiary amine function and a urethane function, and the remainder are hydroxyl groups (—OH), n being an integer ranging from 1 to 20. The paint composition further comprises basic unsaturated modified polydiene compound which is a reaction product of polydiene compound having a molecular weight ranging from 500 to 10,000 and unsaturated double bonds with iodine value ranging from 50 to 500, and containing oxirane oxygen ranging from 3 to 12% by weight, (2) a secondary amine, and $\alpha, \beta$-ethylenic unsaturated carboxylic acid, thereby improving ability for covering the edge of a metal member to be painted.

25 Claims, No Drawings

PAINT COMPOSITION FOR CATION ELECTRODEPOSITION PAINTING

BACKGROUND OF THE INVENTION

1. Field of the Invention

The present invention relates to a paint composition for cation electrodeposition painting which composition is improved in ability (referred hereafter to as "edge covering ability") for covering the edge of a metal member to be painted.

2. Description of the Prior Art

Cation electrodeposition painting has been industrially widely utilized to accomplish painting of a variety of metal members. In the cation electrodeposition painting, the member (serving as a cathode) to be painted is dipped in a cation type aqueous paint liquid prepared by neutralizing resin having basic groups, and then direct current is passed from an anode through the paint liquid to the member to be painted, so that a paint coating film is formed on the surface of the member to be painted. Additionally, a variety of paint compositions have been also proposed and put into practical use. In this connection, Japanese Patent Publication No. 52-6306 and Japanese Patent Provisional Publication No 52-11228 disclose reaction products of amine-added compound of epoxy resin and partially capped polyisocyanate; however, they do not disclose paint composition improving the edge covering ability. Furthermore, Japanese Patent Provisional Publications Nos. 51-119727, 52-147638 and 56-151777 disclose compositions obtained by adding amine or acrylic type double bond to epoxidated compound of a polymer having carbon-carbon double bond and a low polymerization degree, for example, liquid polybutadiene; however, they fail to disclose a paint composition exhibiting excellent edge covering ability, corrosion preventing ability, flexibility, coating film smoothness and low temperature hardening characteristics.

Thus, the above-mentioned conventional paint compositions cannot meet recent requirements of rust prevention in automotive vehicles, i.e., high level edge covering ability or edge rust preventing ability. With the conventional paint compositions, although a major part of a metal member to be painted is coated with a paint coating film having a film thickness of 15–25 micron to be intended to provide sufficient rust prevention ability, the edge of the metal member is coated with only the paint coating film having not more than 3 micron thickness in Which the film thickness depends on edge corner angle, thereby accelerating production of rust. In view of this, the following countermeasures requiring troublesome treatment in addition to the electrodeposition painting have been carried out: for example, the edge of the member to be painted is bent inside to come to a position out of sight, during machining such as cutting before electrodeposition painting. Otherwise, the edge may be covered with an additional material after electrodeposition painting.

SUMMARY OF THE INVENTION

It is an object of the present invention to provide a paint composition for cation electrodeposition painting, excellent in edge covering ability and therefore edge rust-prevention ability, thereby improving rust prevention of a whole metal member while omitting additional treatment in addition to the electrodeposition painting.

Another object of the present invention is to provide a paint composition for cation electrodeposition painting, excellent in flexibility, adhesion, corrosion preventing ability, low temperature hardening ability and smoothness of a paint coating film formed by the electrodeposition painting.

The present invention has been made upon paying attention to the fact that although the edge of a metal member to be painted is sufficiently covered with so-called wet paint coating film before baking, it is not sufficiently covered with so-called dried paint coating film after baking. Studies have been carried out in connection with behavior of viscosity of the paint coating film in the process of baking. As a result, it has been found that the edge covering ability of the dried paint coating film is remarkably improved by using a complex hardening type resin composition having as hardening functional groups ethylene-type double bond, oxidation-polymerizable polydiene bond, easily thermally dissociable blocked isocyanate masked with a tertiary amine containing hydroxyl groups, and hydroxyl group capable of reacting with the blocked isocyanate.

The paint composition of the present invention comprises a first component which is a basic unsaturated modified epoxy ester expressed by the general formula:

$$R_1-C-O-[CH_2-CH-CH_2-O-R_3-O]_n$$
$$\phantom{R_1-C}\|\phantom{O-[CH_2-CH}|$$
$$\phantom{R_1-C}O\phantom{-[CH_2-CH-}X$$

$$-CH_2-CH-CH_2-O-C-R_2$$
$$\phantom{-CH_2-CH}|\phantom{-CH_2-O-}\|$$
$$\phantom{-CH_2-CH}Y\phantom{-CH_2-O-}O$$

where $R_1$ and $R_2$ are functional groups at least one of which is a group of a compound containing $\alpha,\beta$-ethylene type double bond, and the remainder is an group of chain of unsaturated fatty acid; $R_3$ is a group expressed by the formula:

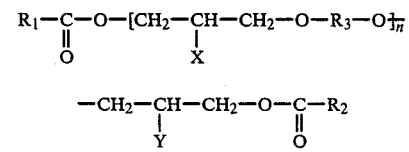

X and Y are functional groups whose total number is $n+1$ in which not less than one functional group is a group containing both a tertiary amine function and a urethane function, and the remainder are hydroxyl groups (—OH); and n is an integer ranging from 1 to 20. Additionally, the paint composition comprises a second component which is basic unsaturated modified polydiene compound having a molecular weight ranging from 500 to 10,000 and double bond with an iodine value ranging from 50 to 500, the unsaturated modified polydiene compound being a reaction product of a polydiene compound containing oxirane oxygen ranging from 3 to 12% by weight, a secondary amine and an $\alpha,\beta$-ethylene type unsaturated carboxylic acid.

Accordingly, cross linking reaction of $\alpha,\beta$-ethylene type unsaturated groups in the first and second components and oxidation polymerization cross linking of polydiene unsaturated groups in the second component gradually proceed in a relatively low temperature range (120°–150° C.) during baking hardening process after the electrdeposition painting, causing a tendency of the viscosity to rise in the paint coating film. This tendency offsets to a considerable extent viscosity lowering in the paint coating film owing to the temperature rising during baking, thereby effectively suppressing viscosity lowering. This prevents the paint coating film from removing from the edge of a metal member to be painted, thus effectively improving the edge covering ability of paint composition for electrodeposition painting. In addition, the paint coating film obtained according to the present invention is excellent in flexibility, adhesion, corrosion preventing ability, low temperature hardening ability, and smoothness of film surface.

DETAILED DESCRIPTION OF THE INVENTION

According to the present invention, a paint composition for electrodeposition painting comprises a first component which is a basic unsaturated modified epoxy ester expressed by the general formula:

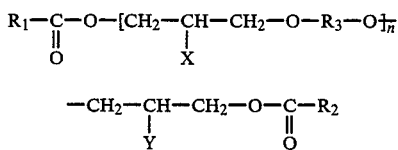

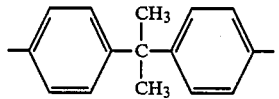

where $R_1$ and $R_2$ are functional groups at least one of which is an $\alpha,\beta$-ethylenic double bond containg group, and the remainder is an unsaturated fatty acid chain; $R_3$ is a group expressed by the formula:

; X and Y are functional groups whose total number is $n+1$ in which no less than one functional group is a group containing both a tertiary amine fuction and a urethane function and the remainder are hydroxyl groups (—OH); and n is an integer ranging from 1 to 20; and a second component which is a basic unsaturated modified polydiene compound having a molecular weight ranging from 500 to 10,000, containing double bond with an iodine value ranging from 50 to 500. The unsaturated modified polydiene compound is reaction product of a polydiene compound containing oxirane oxygen ranging from 3 to 12% by weight, a secondary amine and an $\alpha,\beta$-ethylenic type unsaturated carboxylic acid.

Furthermore, the paint composition optionally comprises a third component which is basic resin containing hydroxyl groups. The basic resin is a reaction product of an epoxy resin derived from epichlorohydrin and bisphenol A and/or a urethane-modified resin of said epoxy resin, and primary and/or secondary alkanolamine. 100 g of the reaction product contains hydroxyl groups ranging from 50 to 500 milliequivalents and amine group ranging from 50 to 300 milliequivalents.

Preferably, the second component in the paint composition amounts to from 1 to 100 parts by weight relative to 100 parts by weight of the first component alone or to the mixture of the first and third components.

With respect to the first component:

The basic unsaturated modified epoxy ester as the first component is obtained by introducing functional groups $R_1$, $R_2$, X and Y into epoxy resin as a starting material. The epoxy resin used in the first component is a compound containing 1,2-epoxy group, derived from epichloohydrin and bisphenol A, in which —O—$R_3$—O— in the general formula is the frame of bisphenol A. The number n of repetitions of a unit containing —O—$R_3$—O— is an integer ranging from 1 to 20 which are determined depending upon the grade of the epoxy resin. It may be possible to jointly use a plurality of epoxy resins having different grades or having different n. Typical examples of such epoxy resin are Epikote Nos. 828, 1001, 1002, 1004 and 1007 (trade names of Shell Kagaku K.K.), AER Nos. 331, 337 and 661 (trade names of Asahi Chemical Industries Co., Ltd.), and ELA-128 and ESA-011 (trade name of Sumitomo Chemical Co., Ltd.) Additionally, high molecular weight epoxy resins obtained by highly polymerizing with bisphenol A low molecular weight liquid state epoxy resins such as the above-mentioned Epikote No. 828, AER-331, ELA-128 may be also used as the epoxy resin for the first component.

The functional group $R_1$ is a group of a compound having $\alpha,\beta$-ethylene type double bond and is introduced by an esterification reaction between an organic acid formulated as $R_1$—COOH and a 1,2-epoxy group. Examples of the organic acid are acrylic acid, methacrylic acid, and crotonic acid. Additionally, this organic acid includes $\alpha,\beta$-ethylenic monobasic acids which are monoesters obtained from reaction between an alcohol having an $\alpha,\beta$-ethylenic function and a dibasic acid anhydride. Examples of such $\alpha,\beta$-ethylen type monobasic acid are monoesters obtained by reaction between 2-hdroxyethyl acrylate, 2-hydroxyethyl methacrylate, 2-hydroxypropyl acrylate or 2-hydroxypropyl methacrylate and maleic anhydride, phthalic anhydride or tetrahydrophthalic anhydride. More than two compounds may be jointly used as the organic acid.

Concerning the functional group $R_2$, the total amount of $R_2$ may be $R_1$. Otherwise, a part of the amount of $R_2$ may be the chain of an unsaturated fatty acid. Examples of the unsaturated fatty acid are castor oil fatty acid, dehydrated castor oil fatty acid, linseed oil fatty acid, tall oil fatty acid, monoester of dimer acid. Introduction of such an unsaturated fatty acid chain into the first component improves wettabilty of the first component to pigment and flexibility of dried coating film of the paint. However, the unsaturated fatty acid chain is inferior in thermal hardenability to $\alpha,\beta$ethylenic double bond, and therefore it is preferable that at least one of functional group $R_1$, $R_2$ having two total number is $\alpha,\beta$-ethylenic double bond.

Concerning the functional groups X and Y, at least one of the total number $n+1$ of the functional groups is a tertiary amine group, and the remainder are hydroxyl groups. The hydroxyl groups amount to the number obtained by subtracting the number consumed by reaction with isocyanate containing tertiary amine from the total number of hydroxyl groups contained in the epoxy resin (as the starting material) and those produced by ring-opening of 1,2-epoxy group.

The group containing a tertiary amine function and a urethane function is introduced into the first compenent by urethanation reaction between a group in the epoxy resin chain and an isocyanate compound containing a tertiary amine. The isocyanate compound containing a tertiary amine is obtained by a urethanation reaction between a polyisocyanate compound and a dialkyl monoalkanolamine. As the polyisocyanate compound, all organic isocyanates containing at lest two isocyanate groups in the molecule can be used. Examples of such an isocyanate are 2,4- and 2,6-tolylene diisocyanates and a mixture thereof, 4,4-diphenylmethane diisocyanate (MDI), crude MDI, MDI whose aromatic rings are hydrogenated, trimethylene diisocyanate, tetramethylene diisocyanate, hexamethylene diisocyanate, 1,4-cyclohexane diiocyanate, 1,2-cyclohexane diisocyanate, isophorone diisocyanate, and prepolymer obtained by reaction between diisocyanate and polyol. The polyol may contain at least three isocyanate groups in a molecule. Examples of the dialkyl monolkanolamine are dimethyl monoethanolamine, diethyl monoethanol amine, diisopropyl monoethanolamine, dimethyl monopropanol amine, diethyl monopropanolamine, and diisopropyl monopropanolamine. In the urethanation reaction between compound and dialkyl monoalkanolamine, the proportion between isocyanate groups and hydroxyl groups is so controlled that 0.7–1.3 isocyanate groups remain in a molecule of reaction product, i.e., isocyanate containing tertiary amine, and additionally the reaction is preferably carried out at a relatively low temperature ranging from 5° to 50° C.

In case the number of isocyanate group in the isocyanate containing the tertiary amine is less than 0.7 the cation groups introduced into the first component upon reaction with hydroxyl groups in the epoxy group chain are fewer and therefore the resultant paint is inferior in water-dilution characteristics. In case the number of the same isocyanate groups is more than 1.3, there increases a possibility of gellation during the reaction in which the cation groups are introduced into the first Component. The urethanation reaction between the isocyanate containing the tertiary amine and hydroxyl groups in the epoxy group chain is carried out by adding the isocyanate containing the tertiary amine (immediately after preparation) to the epoxy group chain-containing resin kept at 40°–100° C. at suitable adding speed, with stirring.

With respect to the second component:

The basic unsaturated modified polydiene compound as the second component of the present invention is obtained by reaction among a polydiene compound having oxirane groups, a secondary amine and an $\alpha,\beta$-ethylenic unsaturated carboxylic acid. The polydiene compound serving as a starting material has a molecular weight which ranges from 500 to 10,000, with unsaturated double bonds having an iodine value ranging from 50 to 500, and contains oxirane oxygen ranging from 3 to 12% by weight. The polydiene compound is obtained by epoxidation of the below-mentioned unsaturated polymer by using known methods, thereby introducing 3–12% by weight of oxirane oxygen. The above-mentioned unsaturated polymer is obtained by polymerization of conjugated diolefine having carbon number of 4 to 10 such as butadiene, isoprene and piperylene used singly or in combination with other conjugated diolefine, or by polymerization of conjugated diolefine and aromatic vinyl monomer (50 mol % or less relative to the conjugated diolefine) capable of copolymerization in the presence of catalyst of alkali metal or organoalkali metal, as disclosed in U.S. Pat. No. 3,789,090, Japanese Patent Publication Nos. 43-27432, 38-1245, 45-507, and 46-0300.

The polydiene compound is allowed to react with secondary amine at 50°–200° C. and with $\alpha,\beta$-ethylenic unsaturated carboxylic acid at 100°–200° C., thereby obtaining the basic unsaturated modified polydiene compound. Although the order of reactions is not essential, it is preferable that secondary amine is first allowed to react, and subsequently unsaturated carboxylic acid is allowed to react, from the viewpoints of preventing gellation and reducing unreacted amine. Furthermore, the above-mentioned polydiene compound is optionally polymerized by reaction with a small amount of primary amine if necessary, in which controlling the amount of the primary amine is required from the viewpoint of preventing gellation.

Examples of the secondary amine suitably used for the second component are aliphatic amines such as dimethylamine and diethylamine, alkanolamines such as methylethanolamine and diethanolamine, and cyclic amines such as morpholine and piperidine. The added amount of the secondary amine to oxirane group is within a range from 30 to 300, preferably 50 to 200, milliequivalents per 100 g of the polydiene compound. If the added amount is less than 30 milliequivalents, cation group is less in the second component and therefore inferior in water-dilution characteristics of the second component. If it is more than 300 milliequivalents, the amount of organic acid necessary for partial neutralization becomes too high so that much gas may be unavoidably generated during electrodeposition painting.

As the $\alpha,\beta$-ethylenic unsaturated carboxylic acid, all carboxylic acids having $\alpha$, $\beta$-ethylenic unsaturated group and capable of reacting in an esterification reaction with an oxirane group in the polydiene compound can be used, in which acrylic acid, methacrylic acid and crotonic acid are preferable. The added amount of $\alpha,\beta$-ethylenic unsaturated carboxylic acid to the above-mentioned polydiene compound is preferably within a range from 30 to 300 milliequivalents. If the added amount is less than 30 miliequivalents, baking-hardenability is insufficient and therefore dried coating film of the paint is inferior in solvent resistance and corrosion resistance. If it is more than 300 miliequivalents, there is a possibility of too high a degree of polymerization during the second component production reaction.

With respect to the third component:

The basic resin containing hydroxyl groups as the third component of the paint composition of the present invention is a reaction product of an epoxy resin derived from epichlorophydrin and bisphenol A and/or a urethane-modified resin of the epoxy resin and primary and/or secondary alkanolamine. The basic resin contains hydroxyl groups ranging 50 to 500 milliequivalents and amine group ranging from 500 to 300 milliequivalents per 100 g of the above-mentioned reaction product. The epoxy resin used for the third component may be the same as that for the first component, or may be urethane-modified epoxy resin which is urethanated with a diisocyanate compound. As such diisocyanate compound, diisocyanate compound of the polyisocyanate compounds described for the first component may be used. In case the diisocyanate compound is prepolymer by reaction with polyol, selection of the kind of polyol influences the flexibility of dried coating film of the paint, solvent resistance, corrosion preventing ability, adhesion and/or coating surface smoothness in connection with the quality of the resultant paint. Such urethane-modified epoxy resin is disclosed, for example, in Japanese Patent Provisional Publication No. 57-170919.

As the primary and/or secondary alkanolamine, any amine containing one or two active hydrogens capable of reacting with a 1,2-epoxy group and containing one or two alkanol groups can be used, in which monoethanolamine, monoisopropanolamine, diethanolamine, diisopropanolamine, and methylethanolamine are preferable. The above-mentioned primary alkanolamine connects two epoxy groups thereby to effect polymerization and simultaneously introduce a hydroxyl group serving as baking-hardening functional group. In case of using primary alkanolamine, it is preferable to use secondary alkanolamine or secondary alkylamine jointly with the primary alkanolamine. The secondary alkanolamine is added to one epoxy group thereby to provide a cation group to the reaction product and introduce a hydroxyl group serving as baking-hardening functional group into the reaction product.

In order to control the basic degree, molecular weight and water-dilution characteristics of the second component primary and/or secondary amines having no alkanol group may be used, in which case the amount of this amine is preferably not more than 50% by weight Of the amount of total amines. Examples of this amine are diethylamine, diisopropylamine, dimethylaminopropylamine, diethylaminopropylamine, aliphatic amines having a carbon number ranging from 5 to 20, and a reaction product between 1 mol of hexamethylenediamine and 2 mol of Cardura E-10 (trade name of Shell Kagaku K.K.).

Reaction between epoxy resin and/or urethane-modified resin of the epoxy resin and primary and/or. secondary alkanolamine, and optionally other amines, is carried out at 50°-150° C. In case the alkanol amine is jointly used with other amine, selection may be made as to reaction manner (individual or simultaneous reaction) and as to addition manner of amine (the same time addition or dropping manner), taking account of reactivity of individual amines and epoxy groups. The amount of hydroxyl groups in the third component is within 50 to 500 milliequivalents, preferably 100 to 300 milliequivalents, per 100 g of the third component. If the hydroxyl groups are less than 50 milliequivalents, and therefore there is less point to jointly using the third component with the combination of the first and second components. If it is more than 500 milliequivalents, the degree is too high and therefore the aqueous dilution characteristics are insufficient while there is a possibility of deterioration of water resistance owing to highly excessive hydroxyl groups remaining in the dried coating film. The amount of amine group in the third component is within a range from 50 to 300 milliequivalents, preferably 60 to 150 milliequivalents. If the amount of the amine group is less than 50 milliequivalents, the cation groups become less thereby to deteriorate aqueous dilution characteristics. If it is more than 300 milliequivalents, the amount of organic acid necessary for partial neutralization becomes too much so that high electrolyzation gas is unavoidably generated during electrodeposition painting.

With respect to the proportions of the first, second and third components of the pint composition of the present invention:

In case the paint composition comprises the first and second components without the third component, the second component is within a range from 1 to 100 parts by weight relative to 100 parts by weight of the first component. In case the paint composition comprises the first, second and third components, the second component is within a range from 1 to 100 parts by weight relative to 100 parts by weight of total of the first and third components, in which the third component is within a range from 99 to 1 parts by weight relative to 1 to 99 parts by weight of the first component.

By combination of the first and second components, a cross linking reaction of $\alpha,\beta$-ethylenic unsaturated group in the both components and oxidation polymerization cross linking of polydiene unsaturated group in the second component gradually proceed in a relatively low temperature range (120° to 150° C.) during baking-hardening, thereby giving rise to a tendency of viscosity rising in the coating film of the paint. In case of a prior art paint composition in which cross linking does not proceed in such a temperature range, viscosity lowering in the paint coating film owing to raised temperature of the coating film is very remarkable and therefore wet coating film deposited at the edge is drawn inwardly under surface tension so that the thickness of the coating film is minimized. As a result, the edge may be exposed without the coating film. However, according to the paint composition of the present invention, such remarkable viscosity lowering can be suppressed to a considerable extent by the above-mentioned viscosity rising due to the gradual cross linking, and additionally the lowest viscosity value can be maintained at a level at which edge covering ability is not lowered. Additionally, in an elevated temperature range higher than a temperature (about 140° to 150° C.) at which lowest viscosity value comes out, rapid viscosity rising is caused along with rapid proceeding of cross linking, thereby providing sufficient edge covering ability. Viscosity variation along with temperature rising in such baking hardening process can be measured by a pendulum type elastoviscosimeter (type DDV-OPA, made by Toyo Baldwin Corporation) preferably under a condition in which the weight of a pendulum is 22 g, moment of inertia is 859 gcm$^2$, and temperature elevation rate is 20° C./min.

If the proportion of the second component relative to the first component or to the total of the first and third components is less than the above-mentioned ranges, there arises a tendency of the edge covering ability to deteriorate. If it is more than the above-mentioned ranges, there arises a tendency of deterioration of dried coating film smoothness and corrosion preventing ability for a naked steel plate. The third component improves smoothness of the dried paint coating film and improves general corrosion preventing ability of a metal member to be coated with the paint. The proportion between the first and third components is substantially optional and accordingly may be determined to an optimum proportion value, taking account of cost, physical property, coating film characteristics etc.

During preparation of the first, second and third components, reaction may be partially made in a condition of 100% solid content. However, the urethanation reaction is preferably carried out in a condition of solid content ranging from 50 to 95% upon using solvents inert to isocyanate functional group, such as toluene, xylene, methyl isobutyl ketone, methyl ethyl ketone, dioxane, cyclohexanone, ethylene glycol dimethyl ether, ethylene glycol monoethyl ether acetate. In case no urethanation reaction is made before and after esterification and amine addition reaction, solvents such as alcohols, ether alcohols, ketone alcohols in addition to the above-mentioned inert solvents may be used to carry out reaction for preparation of the component in the condition of 50-95% solid content. Examples of the solvents are isopropyl alcohol, n-butanol, cyclohexanol, ethylene glycol, propylene gycol, ethylene glycol monomethyl ether, ethylene glycol ethyl ether, ethylene glycol butyl ether, ethylene glycol hexyl ether, propylene glycol phenyl ether and diacetone alcohol.

In order to make water-soluble or water-dispersive the composition comprised of the first and second components or comprised of the first, second and third components, it is necessary that, after mixing the first and second components or the first, second and third components, all or a part of the amino groups are neutralized with formic acid, acetic acid, propionic acid and/or lactic acid. Otherwise, mixing the components may be carried out after neutralizing or making water-soluble or water-dispersive the respective components. Furthermore, organic solvents may be used f the purpose of facilitating water-solubilize or water-dispersion, improving stability of paint aqueous solution, improving fluidity of resin and improving surface smoothness of paint coating film. Examples of these solvents are ethyl cellosolve, propyl cellosolve, butyl cellosolve, ethyl carbitol, butyl carbitol, ethylene glycol dimethyl ether, diethylene glycol dimethyl ether ethyl cellosolve acetate, butyl cellosolve acetate, dioxane, diacetone alcohol, MEK, MIBK, isophorone, toluene and xylene.

In addition, suitable pigments may be blended to the paint composition of the present invention. Examples of the pigments are iron oxide, lead oxide, strontium chromate, carbon black, titanium dioxide, talc, aluminum silicate, and barium sulfate, in which one or more pigments may be blended. Furthermore, metallic salt of organic acid may be blended to the paint composition as catalyst for paint coating hardening. Examples of the organic acid metal salt are manganese acetate, manganese lactate, cobalt acetate, cobalt lactate, lead acetate, lead caprylate, tin acetate, and dibutyltin laurate.

Cation electrodeposition painting with the paint composition of the present invention is, for example, carried out by impressing painting voltage ranging from 50 to 400 V between a cathode (or a member to be painted) and an anode in a condition in which solid content in an aqueous liquid ranges from 5 to 30% by weight, preferably 10 to 20% by weight, for a time ranging from 1 to 5 minutes in an agueous liquid composition condition in which solid content ranges from 5 to 30% by weight, preferably 10 to 20% by weight, and temperature ranges from 20° to 35° C. The painted member is washed by water and then baked in a baking furnace at a temperature ranging from 150° to 200° C. for a time ranging from 10 to 30 minutes thereby to form dried coating film having excellent edge covering ability. It will be noted that even low temperature baking at 150°-170° C. provides, from the paint composition of the present invention, dried coating film having good coating film surface smoothness, flexibility, adhesion, and corrosion resistance.

EXAMPLES AND COMPARATIVE EXAMPLES

The present invention will be more readily understood with reference to the following examples in comparison with comparative examples; however, these examples are intended to illustrate the invention and are not to be construed to limit the scope of the invention.

Production No. 1 of the First Component:

Preparation of 1-1 component:

The below mentioned composition was supplied into a 1 liter four-necked flask, and then reaction was made at 95° C. for 1 hour upon stirring, in which the final acid value was 215 mgKOH/g.

| Composition | Parts by weight |
|---|---|
| Ethyl cellosolve acetate | 132 |
| Tetrahydrophthalic anhydride | 283 |
| 2-hydroxyethyl methacrylate | 242 |
| Triethylamine | 2 |
| Total | 661 |

Preparation of 1-2 component:

Ethyl cellosolve acetate in the below-mentioned proportion was supplied into a clean 3 liter four-necked flask to solve Epikote No. 1001 in the below-mentioned proportion at 80°-90° C. Subsequently, the 1-1 component, castor oil fatty acid, triethylamine and hydroquinone in the below-mentioned proportions were added into the flask and underwent reaction at 110°-120° C. for 5 hors, in which the final acid value was 2.4 mgKOH/g. Then, cooling was made to 60° C.

| Composition | Parts by weight |
|---|---|
| Epikote No. 1001 | 950 |
| Ethyl cellosolve acetate | 440 |
| 1-1 component prepared as mentioned above | 331 |
| Castor oil fatty acid | 289 |
| Triethylamine | 2 |
| Hydroquinone | 2 |
| Total | 2014 |

Preparation of 1-3 component:

Ethyl cellosolve acetate and 2,4-tolylene-diisocyanate in the proportions mentioned below were supplied to a clean 1 liter four-necked flask, and then diethanolamine in the proportion mentioned below was added dropwise into the flask for 1 hour to prepare the 1-3 component, in which unreacted isocyanate group was 33 milliequivalents/100 g.

| Composition | Parts by weight |
|---|---|
| Ethyl cellosolve acetate | 313 |
| 2,4-tolylenediisocyanate | 348 |
| Diethylethanolamine | 234 |
| Total | 895 |

The 1-2 component already prepared as mentioned above was kept at 60° C., and then the 1-3 component was added dropwise to the 1-2 component for 10 minutes upon sufficient stirring. During this, cooling was made to maintain the temperature of the content of the flask at a temperature ranging from 60° C. to 70° C. since reaction heat was generated. After completion of addition of the 1-3 component, the content was kept at 70°-75° C. for 2 hours thereby to obtain a resin product of the first component of the present invention.

Production No. 2 of the First Component:

Ethyl cellosolve acetate in the proportion mentioned below was supplied to a clean 3 liter four-necked flask to solve Epikote No. 1001 in the proportion mentioned below at 80°-90° C. Subsequently, Epikote No. 828, acrylic acid, triethylamine and hydroquinone in the proportions mentioned below were added into the flask to make reaction at 105°-100° C. for 7 hours, in which the final acid value was 1.2 mgKOH/g. Thereafter, the reaction product was cooled to 60° C.

| Composition | Parts by weight |
|---|---|
| Epikote No. 1001 | 475 |
| Epikote No. 828 | 187 |
| Ethyl cellosolve acetate | 314 |
| Acrylic acid | 134 |
| Triethylamine | 1 |
| Hydroquinone | 2 |
| Total | 1113 |

Next, 896 pars by weight of the 1-3 component preparted in the Production No. 1 of the first component was added dropwise to the thus obtained reaction product in the production No. 2 of the first component for 10 minutes. After completion of addition of the 1-3 component, the reaction mixture was maintained at 70°–75° C. for 2 hours thereby to obtain the resin product of the first component of the present invention.

Comparative Production of the First Component:

For the comparison purpose, the production manner of the production No. 2 of the first component was repeated with the exception that 138 parts by weight of propionic acid was used in place of acrylic acid (134 parts by weight), thereby to produce a comparative first component.

Production of the Second Component:

Epoxidation of polybutadiene having a number average molecular weight of 1800 and 64% of 1,2 bond was accomplished with peroxide thereby to produce epoxidated polybutadiene having an oxirane oxygen content of 6.5%. By using the thus produced epoxidated polybutadiene, the second component of the present invention was produced in the following manner.

The above-mentioned epoxidated polybutadiene, ethyl cellosolve d metylethanolamine in the proportions mentioned below were supplied to a clean 3 liter four-necked flask to make reaction at 170° C. for 6 hours. Thereafter, the thus obtained reaction product was cooled to 120° C., and then acrylic acid, hydroquinone and ethyl cellosolve in the proportions mentioned below were added to the reaction product in the flask thereby to further make reaction at 120° C. for 4 hours. The resultant reaction product has an amine value of 108 milliequivalents 100 g, an acid value of 5.5 mgKOH/g, and a solid content of 75% by weight.

| Composition | Parts by weight |
|---|---|
| Epoxidated polybutadiene | 1000 |
| Ethyl cellosolve | 377 |
| Methylethanolamine | 131 |
| Acrylic acid | 81.4 |
| Hydroquinone | 8.8 |
| Ethyl cellosolve | 27.1 |
| Total | 1625.3 |

Production of the Third Component:

Polycaprolactonediol (trade name "Placcel 212" produced by Daicel Chemical Industries Ltd.) and tolylenediisocyanate in the proportions mentioned below were supplied into a clean 3 liter four-necked flask, and then stirring was carried out at 90° C. for 4 hours. Thereafter, 2,2-bis(4-hydroxyphenyl)propane diglycidylether and methyl isobutyl ketone in the proportion mentioned below were added to the content in the flask, and stirring was made at 85° C. for 8 hours Subsequently, ethyl cellosolve and Epikote No. 1001 in the proportions mentioned below were added to the content in the flask, and then stirring was made at 85° C. for 30 minutes therby to dissolve the Epikote No. 1001. Thereafter, the content in the flask was cooled to 60° C., and then diethanolamine in the proportion mentioned below was added to the content in the flask. The content in the flask was again heated to 85° C. and maintained for 1 hour as it was. After cooling, the reaction product in the flask was taken out. The thus produced third component of the present. invention has a base value of 87 milliequivalents/100 g and hydroxyl group of 318 milliequivalents 100 g.

| Composition | Parts by weight |
|---|---|
| Placcel 212 | 500 |
| Tolylenediisocyanate | 170 |
| 2,2-bis(4-hydroxyphenyl)-propane diglycidylether | 700 |
| methyl isobutyl ketone | 350 |
| Epikote No. 1001 | 220 |
| Ethyl cellosolve | 220 |
| Diethanolamine | 160 |
| Total | 2320 |

EXAMPLES 1, 2 and 3 and COMPARATIVE EXAMPLES 1, 2 and 3

The first component produced according to the Production No. 1 or 2 or the comparative first component produced according to the Comparative Production and the second component produced according to the Production of the Second Component were respectively blended as shown in Table 1 thereby to prepare respective mixtures of Examples 1, 2 and 3 (according to the present invention) and Comparative Examples 1, 2 and 3. To each mixtures, 2 parts by weight of carbon black (trade name "M-100", produced by Mitsubishi Chemical Industries Ltd.), 15 parts by weight of clay (trade name "ASP-600", produced by Hayashi Kasei Co, Ltd.) and 2 parts by weight of lead silicate were added and then dispersed by using three rollers. Thereafter, 3 parts by weight of acetic acid was added to the mixture to neutralize it, and then water was gradually added to dilute the mixture to the state of a solid content of 20%, thus preparing paint compositions (corresponding to Examples 1 to 3) of the present invention and comparative paint compositions (corresponding to Comparative Examples 1 to 3).

Electrode deposition painting was accomplished onto metal plates by using the above prepared respective paint compositions thereby preparing specimens on which tests were conducted to evalute edge covering ability, coating film appearance and rust preventing ability. The test results are also shown in Table 1.

TABLE 1

| Item | | Solid Content (%) | Example 1 | Comparative Example 1 | Example 2 | Comparative Example 2 | Example 3 | Comparative Example 3 |
|---|---|---|---|---|---|---|---|---|
| First Component | Production No. 1 | 72 | 104 | 139 | | | | |
| | Production No. 2 | 70 | | | 100 | | 78 | |

TABLE 1-continued

| Item | | Solid Content (%) | Example 1 | Comparative Example 1 | Example 2 | Comparative Example 2 | Example 3 | Comparative Example 3 |
|---|---|---|---|---|---|---|---|---|
| (Parts by weight) | Comparative Production | 69 | | | | 101 | | 80 |
| Second Component | (Parts by weight) | 75 | 33 | 0 | 40 | 40 | 60 | 60 |
| Total | | | 137 | 139 | 140 | 141 | 138 | 140 |
| Edge covering ability (μm) | | | 7 | 3 | 5 | 0 | 6 | 1 |
| Rust preventing ability | Edge section | | 0.5 | 1.5 | 0.3 | 3.0 | 0.3 | 2.0 |
| (mm) | Flat plate section | | 0.5 | 0.5 | 0.5 | 0.5 | 0.5 | 0.5 |

EXAMPLES 4, 5 and 6 and COMPARATIVE EXAMPLES 4 and 5

The above-mentioned first, second and third components produced respectively according to the manners of the Production of the First Component (including Production Nos. 1 and 2), the Production of the Second Component and the Production of the third Component, and the above-mentioned comparative component produced according9 to the Comparative Production of the first component were individually blended as shown in Table 2 thereby to prepare individual mixtures of Example 4, 5 and 6 (according to the present invention) and Comparative Examples 4 and 5. To each mixture, 2 parts by weight of carbon black (trade name "M-10038, produced b Mitsubishi Chemical Industries Ltd.), 15 parts by weight or clay (trade name "ASP-600", produced by Hayashi Kasei Co., Ltd.) and 2 parts by weight of lead silicate were added and then dispersed by using three rollers. Thereafter, 3 parts by weight of acetic acid was added to the mixture to neutralize , and water was gradually added to dilute the mixture to the state of a solid content of 20%, thus preparing paint compositions (corresponding to Examples 4, 5 and 6) of the present invention and comparative paint compositions (corresponding to Comparative Examples 4 and 5).

Electrodeposition painting was accomplished onto metal plates by using the above prepared individual paint compositions thereby preparing specimens on which tests were conducted to evaluate the edge covering ability, coating film appearance and rust preventing ability. The test result is shown in Table 2.

TEST METHOD

The tests for evaluation of items shown in Tables 1 and 2 were conducted as follows:
(1) Edge covering ability Electrodeposition painting was made on a thin steel knife blade to form a paint coating film on the surface of the knife blade. The coating film underwent baking at 170° C. for 20 minutes. The thickness of the coating film at the blade edge section of the knife blade was measured by observing the cross-section of the edge section by means of a microscope, in which the thickness of the coating film at the flat plate section of the knife blade was 20 micron.

(2) Rust preventing ability

A paint coating film having a thickness of 20 micron was formed on the surface of a steel plate treated with zinc phosphate, and baking was carried out at 170° C. for 20 minutes thereby to produce a test piece. Crosscut was formed on the paint coating film of the test piece. The test piece underwent salt-spray test for 840 hours. After the salt-spray test, an adhesive tape (having a width ranging from 18 to 30 mm) was applied along the crosscut onto the surface of the test piece, and thereafter the adhesive tape was torn off upwardly from the test piece at a breath. The width of one side (from the crosscut) of the part of one side of the paint coating film torn off together with the adhesive tape was measured.

(3) Impact resistance

Impact test was conducted by using a Du Pont impact tester (the diameter of a weight member: ½ inch), in which the weight member of 500 g was dropped onto a test piece coated with a paint coating film of electrodeposition painting. The distance between the piece and a point from which the weight member was dropped was measured when the paint coating film on the test piece was broken by the dropped weight member.

(4) Warm salt water test

A test piece coated with a paint coating film having a thickness of 20 micron and formed with cut on the surface thereof was dipped in 5% NaCl aqueous solution at 50° C. for 120 hours. Thereafter, an adhesive tape was applied onto the test piece and thereafter torn off

TABLE 2

| Item | | Solid Content (%) | Example 4 | Comparative Example 4 | Example 5 | Comparative Example 5 | Example 6 |
|---|---|---|---|---|---|---|---|
| First | Production No. 1 | 72 | 84 | | | | |
| Component | Production No. 2 | 70 | | | 93 | | |
| (Parts by weight) | Comparative Production | 69 | | 88 | | 116 | 58 |
| Second component (Parts by weight) | | 75 | 27 | 27 | 27 | 0 | 60 |
| Third Component (parts by weight) | | 75 | 27 | 27 | 20 | 25 | 20 |
| Total | | | 138 | 142 | 142 | 141 | 138 |
| Edge covering ability (μm) | | | 6 | 0 | 6 | 1 | 8 |
| Rust preventing ability | Edge section | | 0 | 2.5 | 0 | 1.2 | 0 |
| | Flat plat section | | 0 | 0.5 | 0 | 0.5 | 0 |
| Impact resistance (cm) | | | 50 or more | 30 | 50 or more | 35 | 50 or more |
| Paint coating film smoothness | | | Rank 5 | Rank 3 | Rank 5 | Rank 4 | Rank 5 |
| Warm salt water test | | | Rank 5 | Rank 2 | Rank 5 | Rank 3 | Rank 5 | from the test piece. Then, observation was made to evaluate the condition of the paint coating film at a location corresponding to the adhesive tape torn off.

(5) Meaning of "Rank" in the paint coating film smoothness and the warm salt water test There are five ranks in which "Rank 1" represents the worst condition while "Rank 5" represents the best condition.

What is claimed is:

1. A paint composition for cation electrodepositionn painting, comprising:

a first component which is basic unsaturated modified epoxy ester expressed by the general formula:

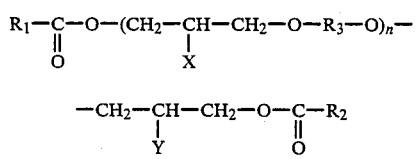

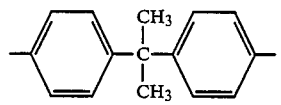

where $R_1$ and $R_2$ are functional groups at least one of which is an $\alpha,\beta$-ethylenic double bond containing group, and the remainder is an unsaturated fatty acid chain; $R_3$ is a group expressed by the formula:

; and X and Y are functional groups whose total number is $n+1$ in which not less than one functional group is a group containing both a tertiary amine function and a urethane function, and the remainder are hydroxyl groups (—OH); n being an integer ranging from 1 to 20; and a second component which is a basic unsaturated modified polydiene compound which is a reaction product of (1) a polydiene compound having a molecular weight ranging from 500 to 10,000 and unsaturated double bonds with an iodine value ranging from 50 to 500, and containing oxirane oxygen ranging from 3 to 12% by weight, (2) a secondary amine, and (3) an $\alpha,\beta$-ethylenic unsaturated carboxylic acid.

2. A paint composition as claimed in claim 1, wherein said second component amounts to 1 to 100 parts by weight relative to 100 parts by weight of said first component.

3. A paint composition as claimed in claim 1, further comprising organic acid for neutralizing at least a part of a mixture of said first and second components, and water for diluting said mixture.

4. A paint composition as claimed in claim 1, wherein said basic unsaturated modified epoxy ester is produced by introducing said functional groups $R_1$, $R_2$, X and Y into an epoxy resin.

5. A paint composition as claimed in claim 4, wherein said epoxy resin is derived from epichlorohydrin and bisphenol A.

6. A paint composition as claimed in claim 4, wherein said functional group $R_1$ is the $\alpha,\beta$ double bond containing group.

7. A paint composition as claimed in claim 4, wherein said functional group $R_1$ is introduced by an esterification reaction between an organic acid expressed by the formula $R_1$—COOH and a 1,2-epoxy group.

8. A paint composition as claimed in claim 7, wherein said organic acid is at least one of acrylic acid, methacrylic acid, crotonic acid or a monoester which is the reaction product of one of 2-hydroxyethyl acrylate, 2-hydroxyethyl methacrylate, 2-hydroxypropyl acrylate or 2-hydroxpropyl methacrylate with one of maleic anhydride, phthalic anhydride or tetrahydrophthalic anhydride.

9. A paint composition as claimed in claim 6, wherein said functional group $R_2$ is the same as said functional group $R_1$.

10. A paint composition as claimed in claim 6, wherein said functional group $R_2$ includes the group unsaturated fatty acid chain.

11. A paint composition as claimed in claim 10, wherein said unsaturated fatty acid is at least one of castor oil fatty acid, dehydrated castor oil fatty acid, linseed oil fatty acid, tall oil fatty acid, or a monoester of dimer acid.

12. A paint composition as claimed in claim 4 wherein said group containing both a tertiary amine function and a urethane function is introduced into said first component by a urethanation reaction between a hydroxyl group in said epoxy resin and an isocyanate compound containing a tertiary amine function.

13. A paint composition as claimed in claim 12, wherein said isocyanate compound containing a tertiary amine function is produced by a urethanation reaction between a polyisocyanate compound and a dialkyl monoalkanolamine.

14. A paint composition as claimed in claim 13, wherein said polyisocyanate compound is at least one of 2,4-tolylenediisocyanate, 2,6-tolylenediisocyanate, a mixture of 2,4- and 2,6-tolylenediisocyanates, 4,4-diphenylmethane diisocyanate (MDI), crude MDI, MDI whose aromatic rings are hydrogenated, trimethylene diisocyanate, tetramethylene diisocyanate, hexamethylene diisocyanate, 1,4-cyclohexane diisocyanate, 1,2-cyclohexane diisocyanate, isophorone diisocyanate or a prepolymer produced by reaction between a diisocyanate and a polyol.

15. A paint composition as claimed in claim 13 wherein said dialkyl monoalkanolamine is at least one of dimethyl monoethanolamine, diethyl monoethanol amine, diisopropyl monoethanolamine, dimethyl monopropanol amine, diethyl monopropanolamine, or diisopropyl monopropanolamine.

16. A paint composition as claimed in claim 1, wherein said unsaturated modified polydiene compound is produced by reaction among a polydiene compound containing oxirane oxygen, a secondary amine, and an $\alpha,\beta$-ethylenic unsaturated carboxylic acid.

17. A paint composition as claimed in claim 16, wherein said polydiene compound containing oxirane oxygen is produced by introducing oxirane oxygen ranging from 3 to 12% by weight into said polydiene compound.

18. A paint composition as claimed in claim 17, wherein said polydiene compound is at least one of butadiene, isoprene, or piperylene.

19. A paint composition as claimed in claim 16, wherein said secondary amine is at least one of dimethylamine, diethylamine, methylethanolamine, diethanolamine, morpholine, or piperidine.

20. A paint composition as claimed in claim 16, wherein the amount of said secondary amine added to the oxirane groups of said oxirane is within a range of from 30 to 300 milliequivalents relative to 100 g of said polydiene compound containing oxiran oxygen.

21. A paint composition as claimed in claim 16, wherein said α,β-ethylenic unsaturated carboxylic acid is at least one of acrylic acid, methacrylic acid, or crotonic acid.

22. A paint composition as claimed in claim 21, wherein the amount of said α,β-ethylenic unsaturated carboxylic acid added to said polydiene compound containing oxirane oxygen is within a range, from 30 to 300 milliequivalents relative to 100 g of said polydiene compound.

23. A paint composition as claimed in claim 3, wherein said organic acid is at least one formic acid, acetic acid, propionic acid, or lactic acid.

24. A paint composition as claimed in claim 1, further comprising a pigment.

25. A paint composition as claimed in claim 24, wherein said pigment is at least one of iron oxide, lead oxide, strontium chromate, carbon black, titanium dioxide, talc, alminium silicate or barium sulfate.

* * * * *